United States Patent Office 3,097,935
Patented July 16, 1963

3,097,935
PRODUCTION OF UNSATURATED GASEOUS HYDROCARBONS AND OF SYNTHESIS GAS
Adolf Steinhofer and Otto Frey, Ludwigshafen (Rhine), and Walter Knobloch, Mannheim-Feudenheim, Germany, assignors to Badische Anilin- & Soda-Fabrik Aktiengesellschaft, Ludwigshafen (Rhine), Germany
No Drawing. Filed Jan. 6, 1958, Ser. No. 707,122
Claims priority, application Germany Jan. 12, 1957
3 Claims. (Cl. 48—215)

This invention relates to a process for the production of unsaturated gaseous hydrocarbons and of gas mixtures containing carbon monoxide and hydrogen by cracking of hydrocarbon oils.

It is known to convert gaseous or liquid hydrocarbons at high temperatures by the fluidized layer method with the supply of oxygen, if desired with the addition of gases which react endothermically, such as steam or carbon dioxide, into gaseous olefines, especially into ethylene. By this method it has not hitherto been possible to obtain from crude mineral oils, residue oils or tars, high yields of unsaturated gaseous hydrocarbons, especially ethylene, and at the same time to prepare in an economical manner synthesis gas containing carbon monoxide and hydrogen. Hitherto the liquid hydrocarbons formed in considerable amounts in the cracking process are recovered as byproducts or they are returned into the cracking process in order to cover the heat requirement of the reaction.

We have now found that in a specially advantageous way both unsaturated gaseous hydrocarbons and gas mixtures containing carbon monoxide and hydrogen, especially synthesis gas, are obtained by cracking hydrocarbon oils in a fluidized bed with oxygen, by returning high boiling products, especially the products boiling higher than gasoline, formed by the cracking of the oil and if desired containing dust, in circulation to the cracking process, wherein at least 0.2 kilogram and at the most 2.0 kilograms, advantageously 0.5 kilogram, of oil are circulated for each kilogram of initial oil introduced, and reacting the low boiling liquid cracked products and/or the gaseous cracked products wholly or partly freed from unsaturated hydrocarbons being reacted at temperatures above 700° C. with oxygen to form synthesis gas containing carbon monoxide and hydrogen.

It has been found that by maintaining the said ratio of circulating liquid to fresh initial material in the first stage of the cracking process, the formation of asphaltic and other substances tending to form carbon black is avoided and there are obtained as products, besides high yields of unsaturated gaseous hydrocarbons, only readily vaporizable liquid substances and gaseous hydrocarbons which can be converted with oxygen into synthesis gas.

The cracking in the first stage takes place at temperatures of about 600° to 900° C. at atmospheric, increased or reduced pressure in a fluidized bed which is formed for example by high temperature coke, brown coal low temperature coke, anthracite or oil coke or by catalytically-active substances. From the gaseous products, the olefines are separated and if desired the carbon dioxide removed, for example by washing with water under pressure. The liquid and any solid products are separated and fractionated in a vaporizer. The high boiling products boiling above the boiling range of gasoline, for example above 250° C., thus obtained are returned to the cracking process, if desired together with the oil coke formed. The oil coke may also be separated and burned or gasified for the production of heat for the process or for other purposes.

The products of lower boiling point, which have a high content of aromatic and naphthenic hydrocarbons, preferably together with the obtained gaseous hydrocarbons wholly or partly freed from olefines, are reacted with oxygen at temperatures above 700° C., advantageously above 800° C., to form synthesis gas. This is advantageously effected in a run-off gas producer at the temperature of the liquid slag. The reaction can also be carried out without a flame in the presence of catalysts with an amount of oxygen insufficient for the complete combustion.

In the process of both stages it may be advantageous to add steam or carbon dioxide, for example the gas obtained by burning the oil coke from the fluidized bed process.

The process according to this invention has the advantage that the amounts of gas produced can be varied, for example by co-gasification of solid or liquid fuels, and thus olefines and synthesis gas can be obtained in any desired ratio, for example in amounts such as come into question for the oxo synthesis. By splitting up the gaseous hydrocarbons obtained in the first stage and by separately working up the methane to synthesis gas and the higher hydrocarbons to olefines, such as ethylene, propylene, butylene or diolefines, such as butadiene, this object can also be achieved.

As initial materials there are suitable for example crude mineral oils, tars and their distillation and conversion products, as for example cracking and hydrogenation products, asphalts, acid tars, waste oils, for example used lubricating oils, animal and vegetable oils.

The synthesis gas obtained may be used for example for the production of ammonia, methanol and butanol. It is especially advantageous to use it together with the olefines obtained in the first stage for the oxo reaction.

The following examples will further illustrate this invention but the invention is not restricted to these examples.

*Example 1*

In a reaction chamber of 1 square meter cross section in the form of a shaft there is situated a fluidized bed consisting of finely-grained oil coke on a metal grate. Upwardly through the grate there is led a mixture of superheated steam and oxygen and above the grate there is sprayed in by means of superheated steam a mineral oil distillation residue boiling above 350° C. as well as the hydrocarbons boiling above 250° C. formed in the process and separated from the gaseous and vaporous reaction products. The relative proportions are so adjusted that a constant temperature of 700° C. prevails in the fluidized layer. From each metric ton of fresh oil there are obtained about 1000 normal cubic meters of a gas of the following composition:

|   | Percent by volume |
|---|---|
| $CO_2$ | 28.2 |
| Gaseous olefines+butadiene | 25.1 |
| CO | 16.8 |
| $H_2$ | 9.9 |
| Gaseous hydrocarbons of the methane series | 17.0 |
| $N_2$ | 3.0 |

The gases and vapors leaving the reaction chamber, after separation of the bulk of the entrained dust, are washed with an oil originating from the process. After separating the oil constituents boiling below 250° C., a residual oil is obtained of which there is returned to the cracking process an amount of 0.5 kilogram per kilogram of fresh oil. By compression of the resultant gas there are obtained for each metric ton of fresh oil introduced 65 kilograms of an oil boiling mainly between 40° and 200° C. which contains for the most part cyclic and aromatic hydrocarbons. The carbon dioxide is washed out from the gas with water under pressure and recovered in concentrated form by decompression.

The low boiling hydrocarbons separated are vaporized and introduced together with oxygen and steam into a gas producer operated with coke of which the temperature is kept at such a height that the slag can be withdrawn in liquid form. With simultaneous gasification of part of the coke there are obtained for each metric ton of fresh oil about 650 normal cubic meters of a gas of the following composition:

| | Percent by volume |
|---|---|
| $CO_2$ | 4.0 |
| CO | 59.5 |
| $H_2$ | 35.1 |
| $CH_4$ | 0.1 |
| $N_2$ | 1.3 |

This gas is used with the admixture of carbon monoxide and hydrogen from the first stage for the synthesis of ammonia.

*Example 2*

Crude mineral oil (Kuwait) is cracked under the conditions of Example 1 but at a fluidized bed temperature of 720° C. For each metric ton of fresh oil there are obtained about 870 normal cubic meters of a gas of the following composition:

| | Percent by volume |
|---|---|
| $H_2S$ | 2.1 |
| $CO_2$ | 25.4 |
| Gaseous olefines including butadiene | 27.7 |
| CO | 14.1 |
| $H_2$ | 10.8 |
| Gaseous hydrocarbons of the methane series | 17.6 |
| $N_2$ | 2.3 |

The hot gases and vapors, after separation of the greater part of the entrained solid fuel (oil coke) in a cyclone, are led into an oil washer. From the heavy residual oil formed at the bottom of the oil washer 0.5 kilogram is returned to the cracking chamber for each 1 kilogram of crude mineral oil, while the gaseous and vaporous products are led from the top of the washer into a column for the purpose of separation. There are also formed oil coke and, for each metric ton of fresh oil, 75 kilograms of an oil boiling mainly between 40° and 200° C. and containing a large amount of aromatics, which can be separated from the gas by compression. These hydrocarbons liquid at room temperature are vaporized and converted as in Example 1 into a mixture of carbon monoxide and hydrogen in a slag run-off producer by means of oxygen and steam at high temperature.

From the gas mixture (composition given above) obtained by cracking the crude oil, after removal of the carbon dioxide by washing with water under pressure, the olefines and methane hydrocarbons with more than one carbon atom are separated in a conventional manner. Ethane, propane and butanes are converted into ethylene by thermal treatment in a fluidized layer furnace at red heat. The methane separated is cracked together with oxygen, steam and the carbon dioxide obtained by washing with water, in a chamber charged with a catalyst containing nickel at 800° C., to give a gas of the following composition:

| | Percent by volume |
|---|---|
| $CO_2$ | 7.60 |
| CO | 23.50 |
| $H_2$ | 68.50 |
| $CH_4$ | 0.06 |
| $N_2$ | 0.34 |

The mixture of carbon monoxide and hydrogen obtained in the run-off producer by cracking the liquid hydrocarbons and by catalytic cracking of methane is converted with the addition of the residual gas containing carbon monoxide and hydrogen obtained by the gas separation, with the olefines, ethylene, propylene and butylenes, formed in the crude oil cracking and in the cracking of the methane homologues, with yields of about 90% into propionaldehyde, butyraldehyde and $C_5$-aldehydes at 200° C. and a pressure of 250 atmospheres with an aqueous cobalt acetate solutions as catalyst.

We claim:
1. A continuous process for the production of gaseous unsaturated hydrocarbons, carbon monoxide, and hydrogen which comprises cracking a hydrocarbon oil with oxygen in a fluidized bed of solids selected from the group consisting of high temperature coke, brown coal low temperature coke, anthracite, oil coke, and catalytically-active substances contained within a reaction vessel at a temperature between about 600° C. and 900° C. whereby gaseous olefins, carbon monoxide, hydrogen, and liquid hydrocarbons are formed; separating said liquid hydrocarbons into fractions boiling above about 250° C. and fractions boiling below about 250° C.; returning to said reaction vessel said hydrocarbons boiling above 250° C. in a ratio of from about 0.2 to 2 parts by weight of recycled hydrocarbons for each one part of hydrocarbon oil feed, recracking said liquid hydrocarbons boiling above 250° C. in said reaction vessel along with additional hydrocarbon feed; and reacting said hydrocarbons boiling below about 250° C. with oxygen at a temperature above 700° C. in a separate reactor to produce carbon monoxide and hydrogen.

2. A process as in claim 1 wherein the cracking is conducted with the addition of an endothermically reacting gas from the group consisting of steam and carbon dioxide.

3. A process as in claim 1 wherein the gaseous cracked products formed in the cracking zone and freed from unsaturated hydrocarbons are reacted with oxygen at a temperature above 700° C. in a separate reactor to form synthesis gas containing carbon monoxide and hydrogen.

References Cited in the file of this patent

UNITED STATES PATENTS

| Re. 21,526 | Odell | Aug. 6, 1940 |
| 1,781,934 | Snyder | Nov. 18, 1930 |
| 1,868,462 | Huff | July 19, 1932 |
| 1,955,268 | Young et al. | Apr. 17, 1934 |
| 2,010,376 | Pyzel | Aug. 6, 1935 |
| 2,385,326 | Bailey | Sept. 25, 1945 |
| 2,568,351 | Milborne | Sept. 18, 1951 |
| 2,677,603 | Van Loon | May 4, 1954 |
| 2,687,986 | Jennings et al. | Aug. 31, 1954 |
| 2,737,474 | Kimberlin | Mar. 6, 1956 |
| 2,775,546 | Kimberlin | Dec. 25, 1956 |
| 2,912,315 | Haney | Nov. 10, 1959 |
| 2,942,960 | Gerhold | June 28, 1960 |

OTHER REFERENCES

Lange: Handbook of Chemistry, 8th ed., page 41.